United States Patent
Lee et al.

(10) Patent No.: US 12,266,760 B2
(45) Date of Patent: *Apr. 1, 2025

(54) SECONDARY BATTERY

(71) Applicant: LG Energy Solution, Ltd., Seoul (KR)

(72) Inventors: Joo Sung Lee, Daejeon (KR); Min Ji Kim, Daejeon (KR); Ho June Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,906

(22) Filed: Dec. 12, 2023

(65) Prior Publication Data

US 2024/0113332 A1 Apr. 4, 2024

Related U.S. Application Data

(63) Continuation of application No. 16/303,472, filed as application No. PCT/KR2018/000496 on Jan. 10, 2018, now Pat. No. 11,908,996.

(30) Foreign Application Priority Data

Jan. 12, 2017 (KR) ........................ 10-2017-0005602
Jan. 4, 2018 (KR) ........................ 10-2018-0001362

(51) Int. Cl.
*H01M 10/0565* (2010.01)
*H01M 10/052* (2010.01)

(52) U.S. Cl.
CPC ..... *H01M 10/0565* (2013.01); *H01M 10/052* (2013.01); *H01M 2300/0085* (2013.01)

(58) Field of Classification Search
CPC ..................... H01M 50/461; H01M 10/0565
See application file for complete search history.

(56) References Cited

U.S. PATENT DOCUMENTS

| | | | |
|---|---|---|---|
| 5,865,860 A | 2/1999 | Delnick | |
| 8,920,522 B2 | 12/2014 | Matsuda et al. | |
| 2007/0054183 A1* | 3/2007 | Kim | H01M 10/0436 429/144 |
| 2010/0297489 A1 | 11/2010 | Beard | |
| 2011/0070479 A1 | 3/2011 | Matsuda et al. | |
| 2013/0095367 A1 | 4/2013 | Kim | |

(Continued)

FOREIGN PATENT DOCUMENTS

| | | |
|---|---|---|
| CN | 1799156 A | 7/2006 |
| CN | 102035015 A | 4/2011 |

(Continued)

OTHER PUBLICATIONS

International Search Report From PCT/KR2018/000496 dated Apr. 23, 2018.

(Continued)

*Primary Examiner* — Nathanael T Zemui
(74) *Attorney, Agent, or Firm* — Lerner David LLP (57) ABSTRACT

The present invention relates to a lithium secondary battery which includes a positive electrode, a negative electrode, a separator disposed between the positive electrode and the negative electrode, and an electrolyte solution, wherein a patterned gel polymer electrolyte layer is included on one surface or both surfaces of at least one structure of the positive electrode, the negative electrode, or the separator.

16 Claims, 2 Drawing Sheets

(56) References Cited

U.S. PATENT DOCUMENTS

| | | |
|---|---|---|
| 2013/0337337 A1 | 12/2013 | Lee et al. |
| 2014/0178740 A1* | 6/2014 | Ryu .................... H01M 50/491 429/144 |
| 2014/0242444 A1 | 8/2014 | Nishikawa |
| 2015/0140402 A1* | 5/2015 | Kim .................... H01M 50/461 429/144 |
| 2015/0228951 A1* | 8/2015 | Yu ....................... H01M 50/457 429/246 |
| 2016/0181653 A1* | 6/2016 | Ji ....................... H01M 10/0585 429/127 |
| 2017/0179520 A1 | 6/2017 | Seo et al. |
| 2017/0271680 A1 | 9/2017 | Fukasawa et al. |
| 2018/0316045 A1 | 11/2018 | Kawabe et al. |
| 2020/0259148 A1* | 8/2020 | Miyazawa .......... H01M 50/449 |

FOREIGN PATENT DOCUMENTS

| | | |
|---|---|---|
| CN | 103201888 A | 7/2013 |
| CN | 105684190 A | 6/2016 |
| EP | 2590251 A2 | 5/2013 |
| JP | H10334890 A | 12/1998 |
| JP | H1167236 A | 3/1999 |
| JP | 2000188131 A | 7/2000 |
| JP | 2007026730 A | 2/2007 |
| JP | 2015222712 A | 12/2015 |
| KR | 20010086972 A | 9/2001 |
| KR | 20020066599 A | 8/2002 |
| KR | 20040090597 A | 10/2004 |
| KR | 20040090598 A | 10/2004 |
| KR | 20110016821 A | 2/2011 |
| KR | 20110033054 A | 3/2011 |
| KR | 20110058657 A | 6/2011 |
| KR | 2012-0127059 A | 11/2012 |
| KR | 20130142224 A | 12/2013 |
| KR | 2014-0011136 A | 1/2014 |
| KR | 20150048082 A | 5/2015 |

OTHER PUBLICATIONS

Extended European Search Report including Written Opinion for Application No. EP18738437.5 dated May 16, 2019, pp. 1-9.

Search Report from Office Action for Chinese Application No. 201880002910.X issued May 6, 2021; 3 pages.

Solvay, Solef® PVDF, Design and Processing Guide, Copyright 2017 Solvay Specialty Polymers, pp. 1-64.

Kynar®/ Kynar Flex®, polyvinylidene fluoride Performance Characteristics & Data, Copyright 2014 Arkema Inc., pp. 1-20.

* cited by examiner

SECONDARY BATTERY

CROSS-REFERENCE TO RELATED APPLICATIONS

The present application is a continuation of U.S. application Ser. No. 16/303,472, filed Nov. 20, 2018, which is a national phase entry under 35 U.S.C. § 371 of International Application No. PCT/KR2018/000496, filed Jan. 10, 2018, which claims priority to Korean Patent Application Nos. 10-2017-0005602, filed Jan. 12, 2017, and Korean Patent Application No. 10-2018-0001362, filed Jan. 4, 2018, the disclosures of which are incorporated herein by reference.

TECHNICAL FIELD

The present invention relates to a secondary battery, and more particularly, to a secondary battery which includes a patterned gel polymer electrolyte layer on one surface or both surfaces of at least one structure of a positive electrode, a negative electrode, or a separator.

BACKGROUND ART

Demand for secondary batteries as an energy source has been significantly increased as technology development and demand with respect to mobile devices have increased, and, among these secondary batteries, lithium secondary batteries having high energy density and high voltage have been commercialized and widely used.

The lithium secondary battery not only has an absolute effect on miniaturization and weight reduction of a device main body, but also becomes a major competitive factor in production and sales of a portable information and communication device depending on whether or not the device may be continuously used for a long period of time.

Particularly, since a lithium polymer battery is not only thin and light as paper, but also its shape may be freely changed and it uses a polymer electrolyte as an electrolyte, the possibility of leakage or the risk of explosion, as disadvantages of a lithium ion battery using a liquid electrolyte, is reduced. Thus, its stability is better. However, since the lithium polymer battery has lower ionic conductivity than the lithium ion battery, the lithium polymer battery is disadvantageous in that discharge capacity is lower, a manufacturing process is more complicated, and manufacturing costs are higher.

Currently, a significant amount of research has been conducted on a polymer electrolyte having excellent conduction characteristics at room temperature, wherein the polymer electrolytes are mostly in the form of a gel. These gel-type polymer electrolytes are prepared by adding a large amount of non-aqueous electrolyte solution to a polymer matrix, wherein these gel-type polymer electrolytes are known as systems that are close to the commercialization of the lithium polymer battery.

However, in a case in which the gel-type polymer electrolyte is used as the electrolyte of the lithium polymer battery, there are problems as follows.

It is disadvantageous in that high-rate battery characteristics are rapidly reduced due to an increase in the thickness of a film for battery molding, and, in a case in which distribution of the electrolyte solution in the battery is not uniform or the amount of the electrolyte solution is not accurately adjusted, the problem, such as non-uniform current during charge and discharge of the battery, occurs, wherein, when the distribution of the non-aqueous electrolyte solution becomes non-uniform, basic battery performance, such as high-rate discharge and life characteristics, is significantly degraded.

Thus, in order to complement these disadvantages, there is a need to develop a gel polymer electrolyte, in which mechanical strength is secured and, simultaneously, ionic conductivity is improved because wetting is excellent and the distribution of the non-aqueous electrolyte solution is uniform, and a secondary battery including the same.

PRIOR ART DOCUMENT

Korean Patent Application Laid-open Publication No. 2011-0058657

DISCLOSURE OF THE INVENTION

Technical Problem

An aspect of the present invention provides a lithium secondary battery which includes a patterned gel polymer electrolyte layer having excellent ionic conductivity while maintaining structural stability.

Technical Solution

According to an aspect of the present invention, there is provided a lithium secondary battery including:
a positive electrode, a negative electrode, a separator disposed between the positive electrode and the negative electrode, and an electrolyte solution,
wherein a patterned gel polymer electrolyte layer is included on one surface or both surfaces of at least one structure of the positive electrode, the negative electrode, or the separator.

Specifically, the patterned gel polymer electrolyte layer may include a plurality of line-type coating portions, which are spaced apart from each other and arranged in parallel, and uncoated portions on which the coating portions are not formed.

In this case, the line-type coating portions may be formed in an oblique direction.

An internal angle of a vertex at an intersection of the line-type coating portion formed in the oblique direction and an edge portion of the structure may be in a range of 5° to 60°, for example, 30° to 50°.

Also, in the patterned gel polymer electrolyte layer, a width of one of lines constituting the coating portion may be in a range of 5% to 90%, for example, 10% to 80% based on a thickness of at least one electrode of the positive electrode or the negative electrode, particularly, the negative electrode.

Furthermore, a width of one of lines constituting the coating portion:a width of the uncoated portion between the lines constituting the coating portion may be in a range of 1:1 to 10:1.

Also, the patterned gel polymer electrolyte layer may include an uncoated portion and a plurality of dot-type coating portions which are spaced apart from each other and formed side by side.

In this case, the dot-type coating portions may have an average diameter of 0.1 mm to 1 mm and a spacing of 0.05 mm to 10 mm.

Furthermore, a thickness of the patterned gel polymer electrolyte layer may be in a range of 0.1% to 1% based on a thickness of the separator.

Also, an area of the coating portions included in the patterned gel polymer electrolyte layer may be in a range of 40% to 90%, for example, 60% to 90% based on a total area of the at least one structure of the positive electrode, the negative electrode, or the separator, particularly, the separator.

Furthermore, the electrolyte solution may be a non-aqueous electrolyte solution.

Advantageous Effects

According to an embodiment of the present invention, a lithium secondary battery may be prepared in which mechanical strength and overvoltage safety may not only be secured, but rate capability is also improved by forming a patterned gel polymer electrolyte layer on one surface or both surfaces of at least one structure of a positive electrode, a negative electrode, or a separator.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DESCRIPTION OF THE SYMBOLS

110: Positive electrode
120, 220: Separator
130: Negative electrode
150: Line-type coating portion
210: Dot-type coating portion
L: Width of line-type uncoated portion between the lines constituting the coating portion
L1: Width of one of lines constituting line-type coating portion
Tc: Thickness of positive electrode
Ta: Thickness of negative electrode
$T_E$: Thickness of patterned gel polymer electrolyte layer
W: Average diameter of dot
S: Spacing between dots
A: Internal angle (angle) of line-type coating portion
B: Cross section of separator including patterned gel polymer electrolyte layer

MODE FOR CARRYING OUT THE INVENTION

Hereinafter, the present invention will be described in more detail with reference to the accompanying drawings. In this case, since configurations illustrated in the drawings described in the present specification are merely the most exemplary embodiments of the present invention and do not represent all the technological spirit of the present invention, it should be understood that there may be various equivalents and modifications capable of replacing them at the time of present application. In addition, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

First, according to an embodiment of the present invention, provided is a lithium secondary battery including a positive electrode, a negative electrode, a separator disposed between the positive electrode and the negative electrode, and an electrolyte solution, wherein a patterned gel polymer electrolyte layer is included on one surface or both surfaces of at least one structure of the positive electrode, the negative electrode, or the separator.

Since the lithium secondary battery of the present invention includes a patterned gel polymer electrolyte layer on one surface or both surfaces of at least one structure of the positive electrode, the negative electrode, or the separator, deformation is small even by an external impact, and thus, excellent strength and safety of the battery may be obtained. In addition, since the non-aqueous electrolyte solution may be uniformly distributed in the patterned gel polymer electrolyte layer, excellent lithium ion permeability and ionic conductivity may be secured, and thus, rate capability of the lithium secondary battery may be further improved.

Figure 1:
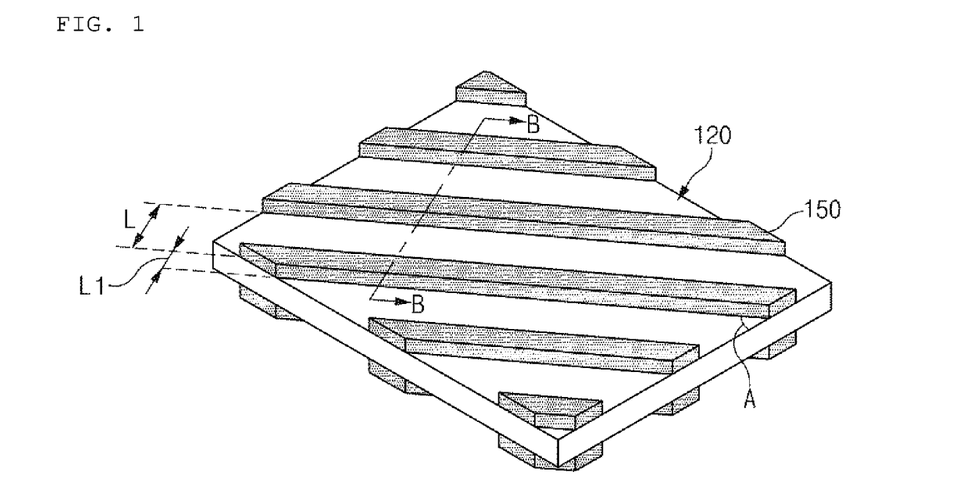
FIG. 1 is a perspective view schematically illustrating an example of a separator, on which a patterned gel polymer electrolyte layer is formed, according to an embodiment of the present invention.
Figure 2:
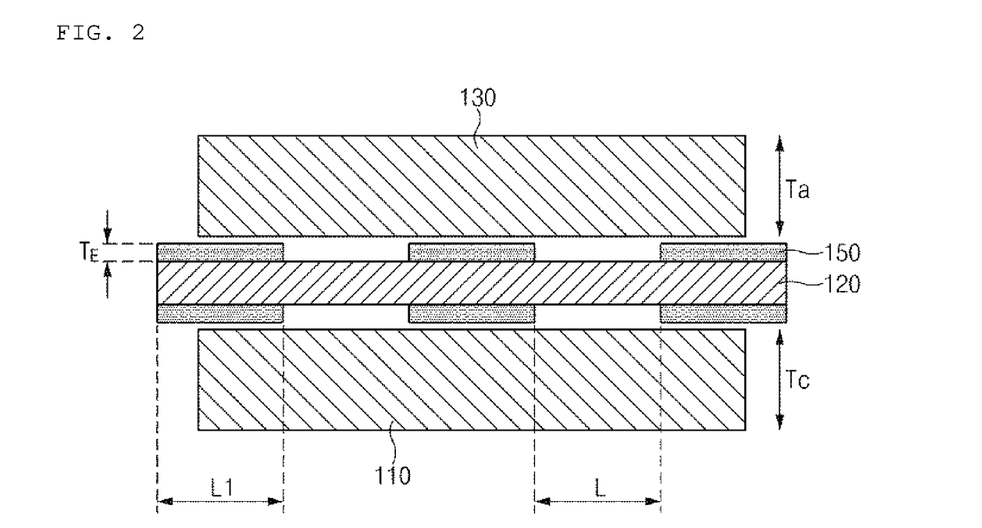
FIG. 2 is a cross-sectional view of an electrode assembly including the separator, on which the patterned gel polymer electrolyte layer is formed, according to the embodiment of the present invention.
Figure 3:
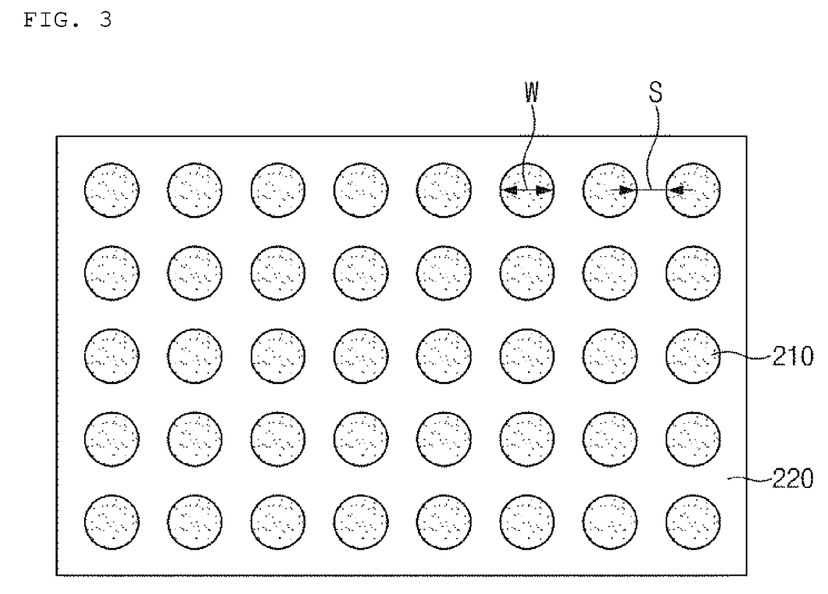
FIG. 3 is a plan view schematically illustrating another example of the separator, on which the patterned gel polymer electrolyte layer is formed, according to the embodiment of the present invention.

Hereinafter, an exemplary embodiment of a separator having a patterned gel polymer electrolyte layer formed thereon according to the present invention or an electrode assembly including the separator is schematically illustrated in FIGS. 1 to 3.

That is, referring to FIGS. 1 and 2, a separator for a lithium secondary battery according to an embodiment of the present invention may include a patterned gel polymer electrolyte layer which includes a plurality of line-type coating portions 150, which are spaced apart from each other and arranged in parallel, and uncoated portions on which the coating portions are not formed. Also, referring to FIG. 3, the separator for a lithium secondary battery according to the embodiment of the present may include a patterned gel polymer electrolyte layer which includes a plurality of dot-type coating portions 210, which are spaced apart from each other and formed side by side, and an uncoated portion on which the coating portions are not formed. In addition, if safety and excellent ionic conductivity of the desired secondary battery may be secured, the patterned gel polymer electrolyte layer may be realized in various forms. In each drawing, the same reference numerals denote the same or equivalent components.

Specifically, FIG. 1 is a perspective view schematically illustrating an example of a separator, on which a patterned gel polymer electrolyte layer is formed, according to an embodiment of the present invention, and FIG. 2 is a cross-sectional view of an electrode assembly including a cross section B of the separator on which the patterned gel polymer electrolyte layer illustrated in FIG. 1 is formed.

Referring to FIG. 1, the lithium secondary battery according to the embodiment of the present invention may include a patterned gel polymer electrolyte layer which includes the plurality of line-type coating portions 150, which are spaced apart from each other and arranged in parallel on a surface of a separator 120, and uncoated portions exposing some areas of the separator.

In this case, the patterned gel polymer electrolyte layer may be formed by a method including the steps of: a) preparing a composition (not shown) for forming a pattern in which a polymerizable polymer is dissolved in an organic solvent, b) coating a surface of the separator 120 with the composition for forming a pattern by a conventional coating method and drying the composition to form a patterned solid polymer electrolyte layer, c) accommodating an electrode assembly, which includes the separator having the solid polymer electrolyte layer formed thereon, in a battery case, and d) injecting a non-aqueous electrolyte solution. That is, in the injecting of the non-aqueous electrolyte solution, since an organic solvent of the injected non-aqueous electrolyte solution swells the solid polymer electrolyte layer, a patterned gel polymer electrolyte layer may be formed. In a case in which a lithium salt is not present in the patterned gel polymer electrolyte layer during the swelling or a concentration of a lithium salt included in the patterned gel polymer electrolyte layer is lower than a concentration of a lithium salt included in the non-aqueous electrolyte solution, a portion of the lithium salt included in the non-aqueous electrolyte solution may move into the gel polymer electrolyte layer.

Also, after the patterned gel polymer electrolyte layer is formed by injecting the non-aqueous electrolyte solution, a curing process may be further performed, if necessary.

The organic solvent used in the preparation of the composition for forming a pattern is not particularly limited as long as it minimizes decomposition due to an oxidation reaction during charge and discharge of the secondary battery while dissolving the polymerizable polymer and is a material that may be mixed with the organic solvent included in the non-aqueous electrolyte solution, and, for example, an organic solvent, such as N-methyl-2-pyrrolidone (NMP) or acetone, may be used.

Furthermore, the polymerizable polymer included during the preparation of the composition for forming a pattern is a material in which a polymerization reaction may occur when heat is applied even in an atmosphere in which a separate polymerization initiator is not included, wherein, specifically, the polymerizable polymer may include at least one of a polyvinylidene difluoride-based compound or a cyanoethyl-based compound.

Typical examples of the polyvinylidene difluoride-based compound may be at least one selected from the group consisting of a polyvinylidene difluoride (PVDF) homopolymer, a polyvinylidene difluoride-hexafluoropropylene copolymer (PVDF-HFP), and a polyvinylidene difluoride-chlorotrifluoroethylene copolymer (PVDF-CTFE).

Also, a typical example of the cyanoethyl-based compound may be cyanoethyl polyvinyl alcohol (CE-PVA).

The composition for forming a pattern may be coated by a screen printing method, a spray coating method, a coating method using a doctor blade, a micro gravure coating method, a silkscreen method, a painting method, a coating method using a slit die, a spin coating method, a roll coating method, or a transfer coating method.

Specifically, in the present invention, the composition for forming a pattern may be coated on the surface of the separator 120 by the micro gravure coating method by which a pattern is easily formed. Dimension and angle of the pattern may be controlled by shape and angle of unevenness of a micro-gravure roll according to a known method, and solid content and flow rate may be freely determined within the preferred scope of the present invention in consideration of working conditions.

In this case, the composition for forming a pattern may be coated in the form of including the plurality of line-type coating portions 150, which are spaced apart from each other and arranged in parallel, and the uncoated portions, and particularly, the line-type coating portions may be formed in an oblique direction (see FIG. 1).

That is, when the composition for forming a pattern is coated, in a case in which the coating portions are formed in the form of a stripe which is parallel to an edge portion or one surface of the structure, the patterned gel polymer electrolyte may not be disposed on the edge or corner portion of the structure in some cases. In this case, since adhesion between the gel polymer electrolyte and the structure is lowered, it may be difficult to secure desired mechanical properties.

Thus, in order for the patterned gel polymer electrolyte to be formed at the edge or corner portion of the structure, the line-type coating portions may be formed in an oblique direction.

In this case, an internal angle A of a vertex at the intersection of the line-type coating portion formed in the oblique direction and the edge portion of the structure may be in a range of 5° to 60°, for example, 30° to 50°. In a case in which the internal angle A of the vertex is less than 5° or greater than 60°, since the line-type coating portion is formed such that its form is similar to the form of a stripe which is parallel to the edge portion or one surface of the structure, the adhesion may be reduced.

The composition for forming a pattern may selectively further include a lithium salt.

The lithium salt may be used without particular limitation as long as it is a compound capable of providing lithium ions used in a lithium secondary battery, and, as a representative example, the lithium salt may include $Li^+$ as a cation, and may include any one selected from the group consisting of $F^-$, $Cl^-$, $Br^-$, $I^-$, $NO_3^-$, $N(CN)_2^-$, $ClO_4^-$, $BF_4^-$, $AlO_4^-$, $AlCl_4^-$, $PF_6^-$, $SbF_6^-$, $AsF_6^-$, $BF_2C_2O_4^-$, $BC_4O_8^-$, $PO_2F_2^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion.

The lithium salt may be included in a concentration of 2 M or less, for example, 0.6 M to 2 M in the composition for forming a pattern. When the concentration of the lithium salt is less than 0.6 M, since conductivity of the electrolyte is lowered, electrolyte performance is degraded, and, in a case in which the concentration of the lithium salt is greater than 2 M, since viscosity of the electrolyte is increased, mobility of the lithium ions may be reduced.

Also, the composition for forming a pattern may selectively further include at least one of a polymerizable monomer and a polymerization initiator.

The polymerizable monomer is not particularly limited as long as it is a compound in which a polymerization reaction may occur, but, for example, the polymerizable monomer may be a compound having at least one polymerizable functional group selected from the group consisting of a vinyl group, an epoxy group, an allyl group, and a (meth) acryl group. Typical examples of the polymerizable monomer may be tetraethylene glycol diacrylate, polyethyleneglycol diacrylate (molecular weight of 50 to 20,000), 1,4-butanediol diacrylate, 1,6-hexanediol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, poly (ethylene glycol) diglycidyl ether, 1,5-hexadiene diepoxide, glycerol propoxylate triglycidyl ether, vinylcyclohexene dioxide, 1,2,7,8-diepoxyoctane, 4-vinylcyclohexene dioxide, butyl glycidyl ether, diglycidyl 1,2-cyclohexanedicarboxylate, ethylene glycol diglycidyl ether, glycerol triglycidyl ether, and glycidyl methacrylate, but the present invention is not limited thereto and these compounds may be used alone or as a mixture of two or more thereof.

The polymerizable monomer may be included in an amount of 0.5 part by weight to 10 parts by weight based on 100 parts by weight of the composition for forming a pattern. If the amount of the polymerizable monomer is less than 0.5 part by weight, it may be difficult to form a gel polymer, and, if the amount of the polymerizable monomer is greater than 10 parts by weight, since a dense polymer may not only be formed, but the amount of the electrolyte solvent in the electrolyte is small, the ionic conductivity of the battery may be reduced and performance degradation of the battery may occur.

Furthermore, a typical polymerization initiator known in the art may be used as the polymerization initiator, and, for example, the polymerization initiator may include organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and at least one azo compound selected from the group consisting of 2,2'-azobis(2-cyanobutane), 2,2'-azobis(methylbutyronitrile), 2,2'-azobis(isobutyronitrile) (AIBN), and 2,2'-azobis(dimethylvaleronitrile) (AMVN).

The polymerization initiator may be dissociated by heat in the battery, for a non-limiting example, at a temperature of 30° C. to 100° C. or may be dissociated at room temperature (5° C. to 30° C.) to form a radical, and may be reacted with a polymerizable monomer by free radical polymerization to form a gel polymer electrolyte.

The polymerization initiator may be included in an amount of 0.01 part by weight to 20 parts by weight based on 100 parts by weight of the composition for forming a pattern. In a case in which the amount of the polymerization initiator is greater than 20 parts by weight, the gelation may occur too quickly or the unreacted initiator may remain to adversely affect the battery performance afterwards. In contrast, in a case in which the amount of the polymerization initiator is less than 0.01 part by weight, the gelation may not be well performed.

Also, as illustrated in FIGS. 1 and 2, in the patterned gel polymer electrolyte layer, a width L1 of one of lines constituting the coating portion may be in a range of 5% to 90%, for example, 10% to 80% based on a thickness of at least one electrode of a positive electrode 110 or a negative electrode 130, particularly, a thickness Ta of the negative electrode 130.

In a case in which the width L1 of one of the lines constituting the coating portion is less than 5%, since a range of a width L of the uncoated portion between the lines constituting the coating portion is too large, mechanical safety of the secondary battery may be reduced. In contrast, in a case in which the width L1 of one of lines constituting the coating portion is greater than 90%, since the uncoated portion (width, L) is relatively small, the amount of the non-aqueous electrolyte solution passing through the uncoated portion is reduced, and thus, ionic conductivity may be reduced. In particular, in a case in which the width L1 of one of lines constituting the coating portion is greater than 90% such that it is greater than a thickness Tc of the positive electrode or the thickness Ta of the negative electrode, tortuosity of a pore structure may increase. As illustrated in FIG. 2, in this case, the thickness Tc of the positive electrode may be the same as the thickness Ta of the negative electrode or may be smaller than the thickness Ta of the negative electrode.

Furthermore, the width L1 of one of lines constituting the coating portion:the width L of the uncoated portion may be in a range of 1:1 to 10:1, and, specifically, for the balance between safety and resistance, it is desirable that the width L1 of one of lines constituting the coating portion and the width L of the uncoated portion between the lines constituting the coating portion are the same.

In this case, a spacing of the coating portions of the patterned gel polymer electrolyte layer, that is, the width L of the uncoated portion between the lines constituting the coating portion may be approximately the same as the thickness Tc of the positive electrode, or the coating portions may be spaced apart with a smaller spacing than the thickness Tc of the positive electrode.

In a secondary battery according to another embodiment of the present invention, the patterned gel polymer electrolyte layer is not limited to the form including the uncoated portions and the line-type coating portions as described above, but may be realized by modifying the coating portion to have a polygonal, circular, or oval structure.

FIG. 3 is a plan view schematically illustrating another example of the separator, on which the patterned gel polymer electrolyte layer is formed, according to the embodiment of the present invention.

Referring to FIG. 3, a patterned gel polymer electrolyte layer, which includes an uncoated portion and the plurality of dot-type coating portions 210 which are spaced apart from each other with a predetermined spacing and formed side by side, may be formed on a surface of a separator 220.

In the dot pattern, shape and size of the dots and the arrangement of the pattern may be changed within a range in which lithium ion transfer capability may be maintained and excellent adhesion to the electrode may be maintained. That is, the shape of the dot may be adjusted to a circular, triangular, rectangular, oval, fan, or rhombus shape, and boundaries of the plurality of dots may be connected to form one dot.

According to an embodiment of the present invention, an average diameter of the dots, a spacing between the dots, and an average thickness of the dots may be variously changed.

Specifically, an average diameter W of the dots may be in a range of 0.1 mm to 1 mm, and a spacing S between the dots, as a separation distance between the dots, that is, a pattern spacing may be in a range of 0.05 mm to 10 mm. A secondary battery including the dot pattern satisfying the above range may not only satisfy adhesion to the separator and electrode, but may also satisfy excellent safety and ionic conductivity of the secondary battery at the same time.

The average diameter W of the dots is described for a case in which the dot has a circular shape, and, in a case in which the dot has a rectangular shape, the expression "average diameter of the dots" denotes a width or height with a maximum length in the dot having a rectangular shape.

Also, in the electrode assembly according to the embodiment of the present invention, a thickness $T_E$ of the patterned gel polymer electrolyte layer illustrated in FIG. 2 may be in a range of 0.1% to 1% based on the thickness of the separator 120.

If the thickness of the patterned gel polymer electrolyte layer is excessively small at less than 0.1%, it may be difficult to obtain desired effects of improving safety and rate capability of the secondary battery, and, in contrast, in a case in which the thickness of the patterned gel polymer electrolyte layer is excessively large at greater than 1%, it is not desirable because there is possibility that distortion occurs due to the coating portions, resistance of the battery is increased, or a thickness of the battery is increased. Specifically, the thickness $T_E$ of the patterned gel polymer electrolyte layer may be in a range of about 0.1 μm to about 2 μm, for example, 0.2 μm to 1 μm.

Furthermore, an area of the coating portions included in the patterned gel polymer electrolyte layer may be in a range of 40% to 90%, for example, 60% to 90% based on a total area of the at least one structure of the positive electrode, the negative electrode, or the separator, particularly, the separator.

Since the secondary battery according to the embodiment of the present invention is less deformed even by an external impact by including the gel polymer electrolyte layer on one surface or both surfaces of the at least one structure of the positive electrode, the negative electrode, or the separator, excellent strength and safety of the battery may be obtained. Also, the secondary battery of the present invention may further improve lithium ion permeability and may secure excellent ionic conductivity by injecting a non-aqueous electrolyte solution to be described later into the uncoated portion. In a case in which the area of the coating portions of the patterned gel polymer electrolyte layer is less than 40%, since an area of the uncoated portion is excessively large, mechanical safety of the secondary battery may be reduced. In contrast, in a case in which the area of the coating portions of the patterned gel polymer electrolyte layer is greater than 90%, that is, the area of the uncoated portion is excessively small, since the amount of the non-aqueous electrolyte solution included in the uncoated portion is reduced, the ionic conductivity is decreased, and thus, rate capability of the secondary battery may be reduced.

As described above, since the secondary battery according to the embodiment of the present invention may secure excellent lithium ion permeability and ionic conductivity as well as mechanical safety by including the patterned gel polymer electrolyte layer, the rate capability of the secondary battery may be further improved.

In the secondary battery according to the embodiment of the present invention, those typically used in the preparation of a lithium secondary battery may all be used as the positive electrode, the negative electrode, and the separator which are used as the structure.

Specifically, the positive electrode, which is used as the structure in the lithium secondary battery of the present invention, may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{s2})O_2$ (where M selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and safety of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$), or lithium nickel cobalt aluminum oxide (e.g., $Li(Ni_{0.8}Co_{0.15}Al_{0.05})O_2$, etc.).

The positive electrode active material may be included in an amount of 80 wt % to 99 wt %, for example, 85 wt % to 95 wt % based on a total weight of solid content in the positive electrode slurry. In a case in which the amount of the positive electrode active material is 80 wt % or less, since energy density is decreased, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode slurry.

Any conductive agent may be used without particular limitation so long as it has conductivity without causing adverse chemical changes in the battery, and, for example, a conductive material as: such graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may include acetylene black (Chevron Chemical Company), Denka black (Denka Singapore Private Limited, or Gulf Oil Company), Ketjen black, ethylene carbonate (EC)-based products (Armak Company), Vulcan XC-72 (Cabot Company), and Super P (Timcal Graphite & Carbon).

The solvent may include an organic solvent, such as N-methyl-2-pyrrolidone (NMP), and may be used in an amount such that desirable viscosity is obtained when the positive electrode active material as well as selectively the binder and the conductive agent is included. For example, the solvent may be included an in amount such that a concentration of the solid content including the positive electrode active material as well as selectively the binder and the conductive agent is in a range of 10 wt % to 70 wt %, for example, 20 wt % to 60 wt %.

Also, the negative electrode used as the structure in the lithium secondary battery of the present invention may be prepared by forming a negative electrode material mixture layer on a negative electrode collector. The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include Si, $SiO_x$ ($0 < x < 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ti, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material such as: graphite such as natural graphite or artificial graphite; a carbon-based material such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The solvent may include water or an organic solvent, such as NMP and alcohol, and may be used in an amount such that desirable viscosity is obtained when the negative electrode active material as well as selectively the binder and the conductive agent is included. For example, the solvent may be included in an amount such that a concentration of the solid content in the negative electrode slurry including the negative electrode active material as well as selectively the binder and the conductive agent is in a range of 50 wt % to 75 wt %, for example, 50 wt % to 65 wt %.

Also, the separator used as the structure in the lithium secondary battery of the present invention plays a role in blocking an internal short circuit between both electrodes and being impregnated with the electrolyte, wherein, after a separator composition is prepared by mixing a polymer resin, a filler, and a solvent, the separator composition is directly coated on the electrode and dried to form a separator film, or, after the separator composition is cast on a support and dried, the separator may be prepared by laminating a separator film peeled from the support on the electrode.

A porous polymer film typically used, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator, and a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

Furthermore, in the lithium secondary battery according to the embodiment of the present invention, it is desirable to use a lithium salt-containing non-aqueous electrolyte solution, which may swell while not dissolving the patterned solid polymer electrolyte layer formed on the structure, as the electrolyte solution.

In this case, the lithium salt may be used without particular limitation as long as it is a compound capable of providing lithium ions used in a secondary battery as well as a lithium secondary battery, and, as a representative example, the lithium salt may include $Li^+$ as a cation, and may include any one selected from the group consisting of $F^-$, $Cl^-$, $Br^-$, $I^-$, $NO_3^-$, $N(CN)_2^-$, $ClO_4^-$, $BF_4^-$, $AlO_4^-$, $AlCl_4^-$, $PF_6^-$, $SbF_6^-$, $AsF_6^-$, $BF_2C_2O_4^-$, $BC_4O_8^-$, $PO_2F_2^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion.

Also, the lithium salt may be included in a concentration of 2 M or less, for example, 0.6 M to 2 M or less in the non-aqueous electrolyte solution. When the concentration of the lithium salt is less than 0.6 M, since ionic conductivity of the non-aqueous electrolyte solution is lowered, electrolyte solution performance is degraded, and, in a case in which the concentration of the lithium salt is greater than 2 M, since viscosity of the non-aqueous electrolyte solution is increased, mobility of the lithium ions may be reduced.

Furthermore, as described above, in the case that the lithium salt is not present in the patterned gel polymer electrolyte layer or the concentration of the lithium salt included in the patterned gel polymer electrolyte layer is lower than the concentration of the lithium salt included in the non-aqueous electrolyte solution, a portion of the lithium salt included in the non-aqueous electrolyte solution may move into the gel polymer electrolyte layer.

Also, the organic solvent is not limited as long as it may minimize decomposition due to an oxidation reaction during charge and discharge of the secondary battery and may exhibit desired characteristics with an additive. For example, an ester-based solvent may be used as an essential component.

The ester-based solvent may include at least one compound selected from the group consisting of a cyclic carbonate compound, a linear carbonate compound, a linear ester compound, and a cyclic ester compound.

Specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof.

Furthermore, specific examples of the linear carbonate compound may be any one selected from the group consisting of dimethyl carbonate (DMC), diethyl carbonate (DEC), dipropyl carbonate, ethyl methyl carbonate (EMC), methylpropyl carbonate, and ethylpropyl carbonate, or a mixture of two or more thereof, but the present invention is not limited thereto.

Also, specific examples of the linear ester compound may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester compound may be any one selected from the group consisting of γ-butyrolactone, γ-valerolactone, γ-caprolactone, σ-valerolactone, and ε-caprolactone, or a mixture of two or more thereof, but the present invention is not limited thereto.

Since the cyclic carbonate compound among the ester-based solvents well dissociates the lithium salt in the electrolyte due to high permittivity as a highly viscous organic solvent, the cyclic carbonate compound may be preferably used. Since an electrolyte solution having high electrical conductivity may be prepared when the above cyclic carbonate compound is mixed with the low viscosity, low permittivity linear carbonate compound, such as dimethyl carbonate and diethyl carbonate, in an appropriate ratio and used, the cyclic carbonate compound may be more preferably used.

Particularly, since the linear ester solvent reduces the viscosity of the electrolyte solution and simultaneously, induces the chelation of lithium cations due to a symmetrical ether structure, the linear ester solvent may increase a degree of dissociation of the lithium salt and may significantly improve the ionic conductivity of the electrolyte solution. Since the ionic conductivity is generally determined by mobility of ions in the electrolyte solution, factors affecting the ionic conductivity are the viscosity of the electrolyte solution and an ion concentration in the solution. The ions freely move in the solution and the ionic conductivity is increased as the viscosity of the solution is decreased, and, since the amount of the ions, as a charge carrier, is increased as the concentration of the ions in the solution is increased, the ionic conductivity is increased. In this case, among the linear ester solvents, ethyl acetate, ethyl propionate, propyl propionate, and butyl propionate may be included.

Furthermore, an ether-based solvent or an amide-based solvent may be further mixed and used as the organic solvent.

As the ether-based solvent, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

As described above, the lithium secondary battery of the present invention may be prepared by a method in which, after the electrode assembly including the patterned solid polymer electrolyte layer on one surface or both surfaces of the at least one structure of the positive electrode, the negative electrode, or the separator is accommodated in a battery case, a patterned gel polymer electrolyte layer is formed by swelling the solid polymer electrolyte by injecting the electrolyte solution. In this case, after the injection of the non-aqueous electrolyte solution, a curing process may be further performed, if necessary.

The curing may be performed through thermal curing and photocuring by irradiation of electron beam, ultraviolet rays, or gamma rays, and, specifically, thermal curing or ultraviolet (UV) curing may be performed at 30° C. to 80° C.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Preparation of Structure Having Patterned Polymer Electrolyte Layer Coated Thereon Example 1. Positive Electrode Having Patterned Polymer Electrolyte Layer Coated Thereon A positive electrode active material slurry (solid content 75%) was prepared by adding LCO (HVC-16C, Tianjin B&M Science and Technology), a conductive agent (Li435, Denka Company Limited), and a binder (KF9700, Kureha Corporation) to an N-methyl-2-pyrrolidone (NMP) solvent at a weight ratio of 97.0:1.5:1.5.

Subsequently, an aluminum (Al) foil was coated with the positive electrode active material slurry in a coating amount of 534 mg/25 cm$^2$ using a slit coating method. After the coating, a positive electrode was prepared by rolling the coated Al foil to a density of about 4.0 g/cc.

Subsequently, a composition for forming a pattern was prepared by dissolving PVDF-HFP (LBG, Arkema) in NMP at a solid content of about 10%. The composition for forming a pattern was coated in the form of lines in an oblique direction on the prepared positive electrode by a micro-gravure method and then dried.

A coating amount of the coated polymer electrolyte layer was adjusted to 3 mg/25 cm$^2$ (coating portion area: 75% of total positive electrode area, uncoated portion area: 25% of the total positive electrode area, coating portion width: 3 mm, uncoated portion width: 1 mm, internal angle of coating portion: 45°).

Example 2. Negative Electrode Having Patterned Polymer Electrolyte Layer Coated Thereon A negative electrode active material slurry (solid content 45%) was prepared by adding artificial graphite (LC1, Shanshan Technology), a conductive agent (C65, Imerys), a dispersant (H1496C, Dai-ichi Kogyo Seiyaku Co., Ltd.), and a binder (SU006, Toyo Ink Group) to water at a weight ratio of 96.5:0.5:1.0:2.0.

Subsequently, a copper (Cu) foil was coated with the negative electrode active material slurry in a coating amount of 284 mg/25 cm$^2$ using a slit coating method. After the coating, a negative electrode was prepared by rolling the coated Cu foil to a density of about 1.7 g/cc.

Subsequently, a composition for forming a pattern was prepared by dissolving a PVDF homopolymer (9300, Kureha Corporation) in NMP at a solid content of about 10%.

The composition for forming a pattern was coated in the form of lines in an oblique direction on the surface of the prepared negative electrode by a micro-gravure method and then dried.

A coating amount of the coated polymer electrolyte layer was adjusted to 2 mg/25 cm$^2$ (coating portion area: 67% of total negative electrode area, uncoated portion area: 33% of the total negative electrode area, coating portion width: 1 mm, uncoated portion width: 0.5 mm, internal angle of coating portion: 45°).

Example 3. Separator (1) Having Patterned Polymer Electrolyte Layer Coated Thereon A slurry for coating a separator having a solid content of 40% was prepared by adding alumina (AES11, Sumitomo Chemical), a dispersant (BG-L01, GL Chem Co., Ltd.), and an acryl-based copolymer (CSB130, Toyo Ink Group), as a binder, to water at a weight ratio of 98.0:1.0:1.0.

A surface of a PE substrate (CU12M, JPG) was coated with the slurry for coating a separator in a coating amount of 20 mg/25 cm$^2$ using a slit coating method to prepare a separator.

Subsequently, a composition for forming a pattern was prepared by dissolving PVDF-CTFE (Solef 32008, Solvay Group) in acetone at a solid content of about 5%.

The composition for forming a pattern was coated in the form of lines in an oblique direction on the surface of the prepared separator by a micro-gravure method and then dried.

A coating amount of the coated polymer electrolyte layer was adjusted to 0.1 mg/25 cm$^2$ (coating portion area: 62% of total separator area, uncoated portion area: 38% of the total separator area, coating portion width: 0.8 mm, uncoated portion width: 0.5 mm, internal angle of coating portion: 45°).

Example 4. Separator (2) Having Patterned Polymer Electrolyte Layer Coated Thereon A slurry for coating a separator having a solid content of 40% was prepared by adding alumina (AES11, Sumitomo Chemical), a dispersant (BG-L01, GL Chem Co., Ltd.), and an acryl-based copolymer (CSB130, Toyo Ink Group), as a binder, to water at a weight ratio of 98.0:1.0:1.0.

A surface of a PE substrate (CU12M, JPG) was coated with the slurry for coating a separator in a coating amount of 20 mg/25 cm$^2$ using a slit coating method to prepare a separator.

Subsequently, a composition for forming a pattern was prepared by dissolving cyanoethyl polyvinyl alcohol (CR-V, Shin-Etsu Chemical Co., Ltd.) in acetone at a solid content of about 5%.

The composition for forming a pattern was coated in the form of lines in an oblique direction on the surface of the prepared separator by a micro-gravure method and then dried.

A coating amount of the coated polymer electrolyte layer was adjusted to 0.1 mg/25 cm$^2$ (coating portion area: 62% of total separator area, uncoated portion area: 38% of the total separator area, coating portion width: 0.8 mm, uncoated portion width: 0.5 mm, internal angle of coating portion: 45°).

II. Lithium Secondary Battery Preparation

Example 5

A negative electrode active material slurry (solid content 45%) was prepared by adding artificial graphite (LC1, Shanshan Technology), a conductive agent (C65, Imerys), a dispersant (H1496C, Dai-ichi Kogyo Seiyaku Co., Ltd.), and a binder (SU006, Toyo Ink Group) to water at a weight ratio of 96.5:0.5:1.0:2.0.

Subsequently, a Cu foil was coated with the negative electrode active material slurry in a coating amount of 284 mg/25 cm$^2$ using a slit coating method. After drying, a negative electrode was prepared by rolling the coated Cu foil to a density of about 1.7 g/cc.

Next, an electrode assembly was prepared by sequentially stacking the prepared negative electrode, a separator formed of three layers of polypropylene/polyethylene/polypropylene (PP/PE/PP), and the positive electrode having the patterned polymer electrolyte layer coated thereon which was prepared in Example 1.

The assembled electrode assembly was put in a battery case, and a lithium secondary battery was prepared by injecting a liquid non-aqueous electrolyte solution composed of ethylene carbonate (EC) and propyl propionate (vol % of 30:70), in which 1.0 M LiPF$_6$ was dissolved, thereinto.

Example 6

A positive electrode active material slurry (solid content 75%) was prepared by adding LCO (HVC-16C, Tianjin B&M Science and Technology), a conductive agent (Li435, Denka Company Limited), and a binder (KF9700, Kureha Corporation) to an NMP solvent at a weight ratio of 97.0:1.5:1.5.

Subsequently, an Al foil was coated with the positive electrode active material slurry in a coating amount of 534 mg/25 cm$^2$ using a slit coating method. After drying, a positive electrode was prepared by rolling the coated Al foil to a density of about 4.0 g/cc.

Next, an electrode assembly was prepared by sequentially stacking the prepared positive electrode, a separator formed of three layers of polypropylene/polyethylene/polypropylene (PP/PE/PP), and the negative electrode having the patterned polymer electrolyte layer coated thereon which was prepared in Example 2.

The assembled electrode assembly was put in a battery case, and a lithium secondary battery was prepared by injecting a liquid non-aqueous electrolyte solution composed of ethylene carbonate (EC) and propyl propionate (vol % of 30:70), in which 1.0 M LiPF$_6$ was dissolved, thereinto.

Example 7

A negative electrode active material slurry (solid content 45%) was prepared by adding artificial graphite (LC1, Shanshan Technology), a conductive agent (C65, Imerys), a dispersant (H1496C, Dai-ichi Kogyo Seiyaku Co., Ltd.), and a binder (SU006, Toyo Ink Group) to water at a weight ratio of 96.5:0.5:1.0:2.0.

Subsequently, a Cu foil was coated with the negative electrode active material slurry in a coating amount of 284 mg/25 cm$^2$ using a slit coating method. After drying, a negative electrode was prepared by rolling the coated Cu foil to a density of about 1.7 g/cc.

Next, a positive electrode active material slurry (solid content 75%) was prepared by adding LCO (HVC-16C, Tianjin B&M Science and Technology), a conductive agent (Li435, Denka Company Limited), and a binder (KF9700, Kureha Corporation) to an NMP solvent at a weight ratio of 97.0:1.5:1.5.

Subsequently, an Al foil was coated with the positive electrode active material slurry in a coating amount of 534 mg/25 cm$^2$ using a slit coating method. After drying, a positive electrode was prepared by rolling the coated Al foil to a density of about 4.0 g/cc.

An electrode assembly was prepared by sequentially stacking the prepared negative electrode and positive electrode and the separator having the patterned gel polymer electrolyte layer coated thereon which was prepared in Example 3.

The assembled electrode assembly was put in a battery case, and a lithium secondary battery was prepared by injecting a liquid non-aqueous electrolyte solution composed of ethylene carbonate (EC) and propyl propionate (vol % of 30:70), in which 1.0 M LiPF$_6$ was dissolved, thereinto.

Example 8

A negative electrode active material slurry (solid content 45%) was prepared by adding artificial graphite (LC1, Shanshan Technology), a conductive agent (C65, Imerys), a dispersant (H1496C, Dai-ichi Kogyo Seiyaku Co., Ltd.), and a binder (SU006, Toyo Ink Group) to water at a weight ratio of 96.5:0.5:1.0:2.0.

Subsequently, a Cu foil was coated with the negative electrode active material slurry in a coating amount of 284 mg/25 cm$^2$ using a slit coating method. After drying, a negative electrode was prepared by rolling the coated Cu foil to a density of about 1.7 g/cc.

Next, a positive electrode active material slurry (solid content 75%) was prepared by adding LCO (HVC-16C, Tianjin B&M Science and Technology), a conductive agent (Li435, Denka Company Limited), and a binder (KF9700, Kureha Corporation) to an NMP solvent at a weight ratio of 97.0:1.5:1.5.

Subsequently, an Al foil was coated with the positive electrode active material slurry in a coating amount of 534 mg/25 cm$^2$ using a slit coating method. After drying, a positive electrode was prepared by rolling the coated Al foil to a density of about 4.0 g/cc.

An electrode assembly was prepared by sequentially stacking the prepared negative electrode and positive electrode and the separator having the patterned gel polymer electrolyte layer coated thereon which was prepared in Example 4.

The assembled electrode assembly was put in a battery case, and a liquid non-aqueous electrolyte solution composed of ethylene carbonate (EC) and propyl propionate (vol % of 30:70), in which 1.0 M LiPF$_6$ was dissolved, was injected thereinto.

Subsequently, a lithium secondary battery was prepared by curing the separator having the gel polymer electrolyte layer coated thereon by storing it at 60° C. for 2 days.

Comparative Example 1

A negative electrode active material slurry (solid content 45%) was prepared by adding artificial graphite (LC1, Shanshan Technology), a conductive agent (C65, Imerys), a dispersant (H1496C, Dai-ichi Kogyo Seiyaku Co., Ltd.), and a binder (SU006, Toyo Ink Group) to water at a weight ratio of 96.5:0.5:1.0:2.0.

Subsequently, a Cu foil was coated with the negative electrode active material slurry in a coating amount of 284 mg/25 cm$^2$ using a slit coating method. After the coating, a negative electrode was prepared by rolling the coated Cu foil to a density of about 1.7 g/cc.

Next, a positive electrode active material slurry (solid content 75%) was prepared by adding LCO (HVC-16C, Tianjin B&M Science and Technology), a conductive agent (Li435, Denka Company Limited), and a binder (KF9700, Kureha Corporation) to an NMP solvent at a weight ratio of 97.0:1.5:1.5.

Subsequently, an Al foil was coated with the positive electrode active material slurry in a coating amount of 534 mg/25 cm$^2$ using a slit coating method. After the coating, a positive electrode was prepared by rolling the coated Al foil to a density of about 4.0 g/cc.

An electrode assembly was prepared by sequentially stacking the prepared negative electrode and positive electrode and a separator formed of three layers of polypropylene/polyethylene/polypropylene (PP/PE/PP).

The assembled electrode assembly was put in a battery case, and a lithium secondary battery was prepared by injecting a non-aqueous electrolyte solution composed of ethylene carbonate (EC) and propyl propionate (vol % of 30:70), in which 1.0 M LiPF$_6$ was dissolved, thereinto.

Comparative Example 2

A positive electrode active material slurry (solid content 75%) was prepared by adding LCO (HVC-16C, Tianjin B&M Science and Technology), a conductive agent (Li435, Denka Company Limited), and a binder (KF9700, Kureha Corporation) to an NMP solvent at a weight ratio of 97.0:1.5:1.5.

Subsequently, an Al foil was coated with the positive electrode active material slurry in a coating amount of 534 mg/25 cm$^2$ using a slit coating method. After the coating, a positive electrode was prepared by rolling the coated Al foil to a density of about 4.0 g/cc.

Subsequently, after a composition for forming a pattern was prepared by dissolving PVDF-HFP (LBG, Arkema) in NMP at a solid content of about 10%, the composition for forming a pattern was coated on the entire surface of the prepared positive electrode by a micro-gravure method (coating amount: 3 mg/25 cm$^2$).

An electrode assembly was prepared by sequentially stacking the prepared positive electrode, the negative electrode used in Comparative Example 1, and a separator formed of three layers of polypropylene/polyethylene/polypropylene (PP/PE/PP).

The assembled electrode assembly was put in a battery case, and a lithium secondary battery was prepared by injecting a non-aqueous electrolyte solution composed of ethylene carbonate (EC) and propyl propionate (vol % of 30:70), in which 1.0 M LiPF$_6$ was dissolved, thereinto.

EXPERIMENTAL EXAMPLES

Experimental Example 1: Overcharge Safety Evaluation Test

Overcharge safety evaluation test was performed on the lithium secondary batteries prepared in Examples 5 to 8 and the lithium secondary batteries prepared in Comparative Examples 1 and 2 according to the PSE standard (charged to 10 V at an external temperature of 55° C.), and the results thereof are presented in Table 1 below.

Experimental Example 2: Rate Capability Evaluation Test

A change in capacity in a range of 4.4 V to 3.0 V was observed for each of the lithium secondary batteries prepared in Examples 5 to 8 and the lithium secondary batteries prepared in Comparative Examples 1 and 2 at a fixed charge rate of 0.5 C at 25° C. while changing a discharge rate to 1.5 C and 0.2 C.

The results thereof are presented in Table 1 below.

TABLE 1

| | Presence of ignition | 1.5 C discharge capacity/0.2 C discharge capacity |
|---|---|---|
| Example 5 | X | 89.3% |
| Example 6 | X | 90.6% |
| Example 7 | X | 91.1% |
| Example 8 | X | 88.6% |
| Comparative Example 1 | ○ | 91.8% |
| Comparative Example 2 | X | 83.5% |

Referring to Table 1, the lithium secondary batteries of Examples 5 to 8 including the patterned gel polymer electrolyte were not ignited under the PSE condition, and it may be understood that rate capabilities were all high at 88.6% or more.

In contrast, the lithium secondary battery of Comparative Example 1, which did not include a gel polymer electrolyte but only included the non-aqueous electrolyte solution, had high rate capability due to physical characteristics in comparison to the secondary batteries of Examples 5 to 8, but it may be understood that ignition occurred under the PSE condition. Thus, it may be understood that overcharge safety of the lithium secondary battery of Comparative Example 1 was degraded in comparison to those of the secondary batteries of Examples 5 to 8.

Also, ignition of the secondary battery of Comparative Example 2, which included the positive electrode having the gel polymer electrolyte coated on the entire surface thereof, did not occur under overcharge conditions, but, since resistance was increased due to the coating of the entire surface, it may be understood that rate capability was deteriorated in comparison to those of the secondary batteries of Examples 5 to 8.

The invention claimed is:
1. A lithium secondary battery comprising:
a positive electrode, a negative electrode, a separator disposed between the positive electrode and the negative electrode, and an electrolyte solution, wherein a patterned gel polymer electrolyte layer is included on one surface or both surfaces of at least one structure of the positive electrode, the negative electrode, or the separator, wherein the patterned gel polymer electrolyte layer comprises uncoated portions and a plurality of line-type coating portions which are spaced apart from each other and arranged in parallel, wherein the line-type coating portions are formed in an oblique direction in direction to an edge of the at least one structure, wherein a width of one of lines constituting the coating portion:a width of the uncoated portion between the lines constituting the coating portion is in a range of 1:1 to 10:1, wherein the gel polymer electrolyte has a thickness of 0.1 µm to 1 µm, wherein an area of the coating portions of the patterned gel polymer electrolyte layer is in a range of 61% to 90% of a total area of the at least one structure of the positive electrode or the negative electrode, and wherein a width of one of lines constituting the coating portion is in a range of 14% to 90% based on a thickness of the negative electrode.

2. The lithium secondary battery of claim 1, wherein an internal angle of a vertex at an intersection of the line-type coating portion formed in the oblique direction and an edge portion of the structure is in a range of 5° to 60°.

3. The lithium secondary battery of claim 1, wherein an internal angle of a vertex at an intersection of the line-type coating portion formed in the oblique direction and an edge portion of the structure is in a range of 30° to 50°.

4. The lithium secondary battery of claim 1, wherein a width of one of lines constituting the coating portion is in a range of 14% to 80% based on a thickness of the negative electrode.

5. The lithium secondary battery of claim 1, wherein a thickness of the patterned gel polymer electrolyte layer is in a range of 0.1% to 1% based on a thickness of the separator.

6. The lithium secondary battery of claim 1, wherein the electrolyte solution is a non-aqueous electrolyte solution.

7. The lithium secondary battery of claim 1, where in the patterned gel polymer electrolyte layer is formed by:
a) preparing a composition for forming a pattern in which a polymerizable polymer is dissolved in an organic solvent,
b) coating a surface of the at least one structure of the positive electrode, the negative electrode, or the separator with the composition for forming a pattern and drying the composition to form a patterned solid polymer electrolyte layer,
c) accommodating an electrode assembly, which includes the at least one structure of the positive electrode, the negative electrode, or the separator having the solid polymer electrolyte layer formed thereon, in a battery case, and
d) injecting a non-aqueous electrolyte solution to form a patterned gel polymer electrolyte layer.

8. A lithium secondary battery comprising:
a positive electrode, a negative electrode, a separator disposed between the positive electrode and the negative electrode, and an electrolyte solution,
wherein a patterned gel polymer electrolyte layer is included on one surface or both surfaces of at least one structure of the positive electrode, the negative electrode, or the separator,
wherein the patterned gel polymer electrolyte layer comprises uncoated portions and a plurality of line-type coating portions which are spaced apart from each other and arranged in parallel,
wherein the line-type coating portions are formed in an oblique direction in direction to an edge of the at least one structure,
wherein a width of one of lines constituting the coating portion:a width of the uncoated portion between the lines constituting the coating portion is in a range of 1:1 to 10:1,
wherein the gel polymer electrolyte has a thickness of 0.1 µm to 1 µm, and
wherein a width of one of lines constituting the coating portion is in a range of 14% to 90% based on a thickness of the negative electrode.

9. The lithium secondary battery of claim 8, wherein an internal angle of a vertex at an intersection of the line-type coating portion formed in the oblique direction and an edge portion of the structure is in a range of 5° to 60°.

10. The lithium secondary battery of claim 8, wherein an internal angle of a vertex at an intersection of the line-type coating portion formed in the oblique direction and an edge portion of the structure is in a range of 30° to 50°.

11. The lithium secondary battery of claim 8, wherein the area of the coating portions of the patterned gel polymer electrolyte layer is in a range of 40% to 90% of the total area of the at least one structure of the positive electrode, the negative electrode, or the separator.

12. The lithium secondary battery of claim 8, wherein the area of the coating portions of the patterned gel polymer electrolyte layer is in a range of 60% to 90% of the total area of the at least one structure of the positive electrode, the negative electrode, or the separator.

13. The lithium secondary battery of claim 8, wherein the area of the coating portions of the patterned gel polymer electrolyte layer is in a range of 61% to 90% of the total area of the at least one structure of the positive electrode, the negative electrode, or the separator.

14. The lithium secondary battery of claim 8, wherein a thickness of the patterned gel polymer electrolyte layer is in a range of 0.1% to 1% based on a thickness of the separator.

15. The lithium secondary battery of claim 8, wherein the electrolyte solution is a non-aqueous electrolyte solution.

16. The lithium secondary battery of claim 8, where in the patterned gel polymer electrolyte layer is formed by:
a) preparing a composition for forming a pattern in which a polymerizable polymer is dissolved in an organic solvent,
b) coating a surface of the at least one structure of the positive electrode, the negative electrode, or the separator with the composition for forming a pattern and drying the composition to form a patterned solid polymer electrolyte layer,
c) accommodating an electrode assembly, which includes the at least one structure of the positive electrode, the negative electrode, or the separator having the solid polymer electrolyte layer formed thereon, in a battery case, and
d) injecting a non-aqueous electrolyte solution to form a patterned gel polymer electrolyte layer.

\* \* \* \* \*